United States Patent [19]
Liedtke et al.

[11] Patent Number: 5,373,423
[45] Date of Patent: Dec. 13, 1994

[54] LIGHT FOR MOTOR VEHICLE

[75] Inventors: Frieder Liedtke, Dettingen; Kurt Schuster, Reutlingen; Norbert Allex, Kirchheim, all of Germany

[73] Assignee: Robert Bosch GmbH, Stuttgart, Germany

[21] Appl. No.: 69,930

[22] Filed: May 28, 1993

[30] Foreign Application Priority Data

Aug. 29, 1992 [DE] Germany .............................. 4228892

[51] Int. Cl.⁵ .......................... F21Q 1/00; B60Q 1/26
[52] U.S. Cl. ...................................... 362/61; 362/268; 362/291; 362/292; 362/293; 362/299; 362/331
[58] Field of Search ................. 362/61, 354, 268, 291, 362/292, 331, 298, 299

[56] References Cited

U.S. PATENT DOCUMENTS 4,241,388 12/1980 Green .................................. 362/268
4,525,772 6/1985 Peck ..................................... 362/331

FOREIGN PATENT DOCUMENTS 282032 11/1963 Australia .............................. 362/354
3148668 7/1983 Germany .
176917 12/1920 United Kingdom ................ 362/354

Primary Examiner—Ira S. Lazarus
Assistant Examiner—Sara Sachie Raab
Attorney, Agent, or Firm—Michael J. Striker

[57] ABSTRACT

A motor vehicle light, especially a signal light comprises a light source, a reflector, a closure disc for closing the motor vehicle light from outside, a collective lens device arranged between the reflector and the closure disc, a screen device arranged between the collective lens device and the closure disc and having light impermeable regions and light permeable regions. The collective lens device directs light which is reflected from the reflector to the light permeable regions. The screen device is formed reflective at its side facing the closure disc, the screen device at least at its side facing the closure disc being curved concavely.

7 Claims, 1 Drawing Sheet

LIGHT FOR MOTOR VEHICLE

BACKGROUND OF THE INVENTION

The present invention relates generally to lights for motor vehicles.

More particularly, it relates to signal lights which have a light source, a reflector, a cover disc which closes the light and a collective lens unit located between the reflector and the cover disc.

Lights of the above mentioned general type are known in the art. One of such lights is disclosed in the German document DE 31 48 668 A1. In this light a collective lens device is arranged between the cover disc and the reflector, and a screen device is located between the collective lens device and the cover disc. The screen device is formed by a plate which is reflectingly coated at its side facing the cover disc and has a plurality of passages on which the light reflected by the reflector through the collective lens device is concentrated and thereby can pass without obstacles through the screen device. The light which enters the vehicle light from outside is not directionally reflected by the reflector and thereby is not concentrated by the collective lens device on the passages. Therefore it can exit the vehicle light only to a small degree causing a so-called "phantom light" which provides the appearance that the vehicle light is in operation even when it is turned off. A color filter can be arranged between the reflector and the screen device so that the light exiting the vehicle light can obtain a desired color. The plate of the screen device is flat. However, when the cover disc is inclined, it can be stepped in correspondence with its inclination. The plate is therefore recognizable from outside of the vehicle light and distorts the whole impression of the light since its depth appears to be reduced by the plate. This is especially disturbing when the light is arranged near a headlight, in which case the reflector is visible from outside and therefore is seen with a great depth.

SUMMARY OF THE INVENTION

Accordingly, it is an object of the present invention to provide a light of the above mentioned general type which avoids the disadvantages of the prior art.

In keeping with these objects and with others which will become apparent hereinafter, one feature of the present invention resides, briefly stated, in a light for motor vehicles in which the screen device is concavely curved at least at its side facing the cover disc.

When the light is designed in accordance with the present invention it has the advantage that when considered from outside it appears to have a greater depth. Thereby a uniform appearance with a headlight located near the light in question can be obtained.

In accordance with other features of the present invention, the screen device can be formed as a concavely curved plate composed of a light-impermeable material interrupted for forming the light permeable regions.

In accordance with another advantageous feature of the present invention, the collective lens device can be formed of one piece with the plate. With this construction the collective lens device and the screen device are formed as a single element which reduces the manufacturing expenses for the light.

Finally, the screen device can be curved parabolically at least on its side facing the cover disc, and the plate can extend substantially parallel to the reflection surface of the reflector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
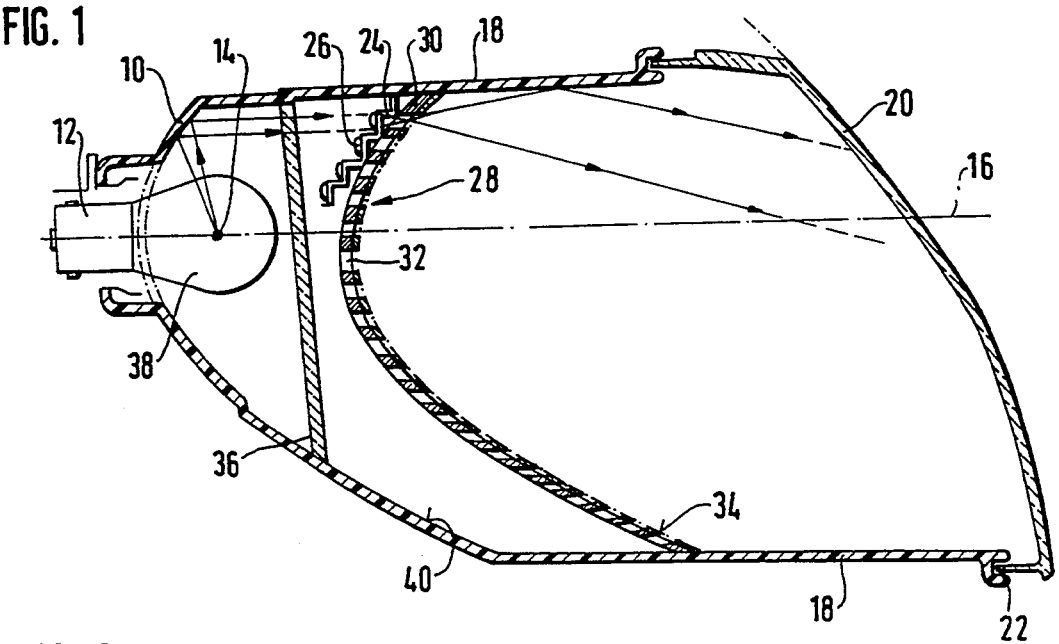
FIG. 1 is a view showing a light in accordance with the present invention in a vertical longitudinal section, in a first embodiment.
Figure 2:
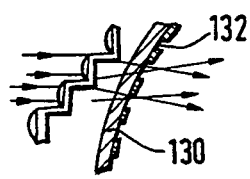
FIG. 2 is a view showing a section of the light in accordance with a variant of a screen device.

A light for a motor vehicle shown in FIGS. 1 and 2 has a reflector 10 and a light source 12 which is inserted in an opening in an apex region of the reflector. The light source can be formed as an incandescent lamp. The reflection surface of the reflector 10 is parabolic and a light body 14 of the light source 12 is arranged in its focal point. Therefore the light which is emitted by the light source 12 is reflected by the reflector 10 parallel to its optical axis 16. The reflector 10 has upper and lower walls 18 as well as not shown lateral walls which extend in the light direction from its apex and form a housing of the light. A cover disc 20 is mounted at the front edge of the walls. For example it is glued in a peripheral flange 22 which is formed on the front edge. The cover disc 20 can be provided with optical elements for influencing the light exiting from the vehicle light, so that it radiates for forming a predetermined light intensity distribution. The cover disc 20 is formed as a colorless, transparent disc and can be composed of synthetic plastic material or glass. It is inclined vertically to the optical axis 16 or relative to a vertical plane as shown in FIGS. 1 and 2 and/or is arranged turned relative to a horizontal plane.

A transparent lens disc 24 is arranged in the region between the cover disc 20 and the reflector 10 in the vehicle light housing. It is formed by a plurality of collective lenses 26. The collective lenses 26 are arranged on the side of the disc 24 which faces the reflector 10. In FIG. 1 for simplifying the showing, the collective lenses 26 are arranged only in a partial region. However, it is to be understood that they are provided over the whole surface of the disc 24. The disc 24 can be composed of glass or synthetic plastic material. A screen device 28 is arranged in the vehicle light housing between the cover disc 20 and the lens disc 24. It is composed of a plate 30 which is formed substantially light-impermeable and also has a plurality of light-permeable regions. The light- permeable regions are formed as passages 32 in the plate 30 and have small diameters when compared with the size of the plate.

The passages 32 can be cylindrical or conically expanding in a light direction. The plate 30 is arranged near the reflector 10 and the cover disc 20. On its side which faces the cover disc 20 it is provided with a reflecting coating 34 which can be for example silver color coating. The plate 30 is concavely curved toward the cover disc 20 and the lens disc 24 has substantially the same curvature as the plate 30. The plate 30 is curved in the plane which is perpendicular to the plane of the drawings and provides during observation from outside of the vehicle light the impression of a curved body. The plate 30 can be for example curved parabolically, substantially as the reflector 10. The lens disc 24 is stepped and substantially follows the course of the curvature of the plate 30. The reflective coating can be applied on the plate 30 for example by evaporation or sputtering and formed as an aluminum coating.

The light reflected by the reflector 10 is oriented by the collective lenses 26 of the lens disc 24 onto the passages 32 and can pass through them without obstacle and exit the vehicle light. The light entering the vehicle light from outside can pass through the passages 32 only to a small part and reach the reflector 10 and then is reflected by the reflector non-directionally, so that only small part of it can exit the vehicle light. The greater part of the light entering the vehicle light from outside is reflected by the reflection layer 34 on the plate 30, so that during observation from outside the vehicle light in non-turned-on condition is seen as a conventional light without the screen device 28.

In accordance with a variant of the vehicle light of the invention, the collective lenses 26 are formed as cylinder lenses and extend horizontally or vertically. In correspondence with this, the passages 32 are designed as horizontally or vertically extending throughgoing lines.

In order to provide the desired color for the light exiting the vehicle light, a color filter 36 can be arranged between the plate 30 and the reflector 10. Alternatively, the lens disc 24 can be colored in a corresponding color, so that no additional color filter is needed. In accordance with a further alternative, the light source 12 can have a glass bulb 38 colored in a corresponding color. Finally, the reflector 10 can be provided with a reflection layer 40 colored in a corresponding color. The light appears however as silver during the observation from outside in a not-turned-on condition due to the visible reflection layer 34 of the plate 30. However, during operation the light exiting the vehicle light has a desired light color.

In an embodiment shown in FIG. 2, the vehicle light includes a plate 130 of a screen device 28 of a transparent material such as synthetic plastic or glass, and is provided on its side facing the cover disc 20 with a reflecting coating 34 which is interrupted for forming the light permeable regions 132. The plate 30 is concavely curved as in the first embodiment. Similarly to the first embodiment the light reflected by the reflector is directed by the collective lenses of the lens disc onto the light permeable regions 132 and can pass through them without hindrance. As in the first embodiment, here the measures for obtaining a desired light color can be utilized as well. As an additional alternative, the plate 130 can be colored in the desired light color.

Figure 3:
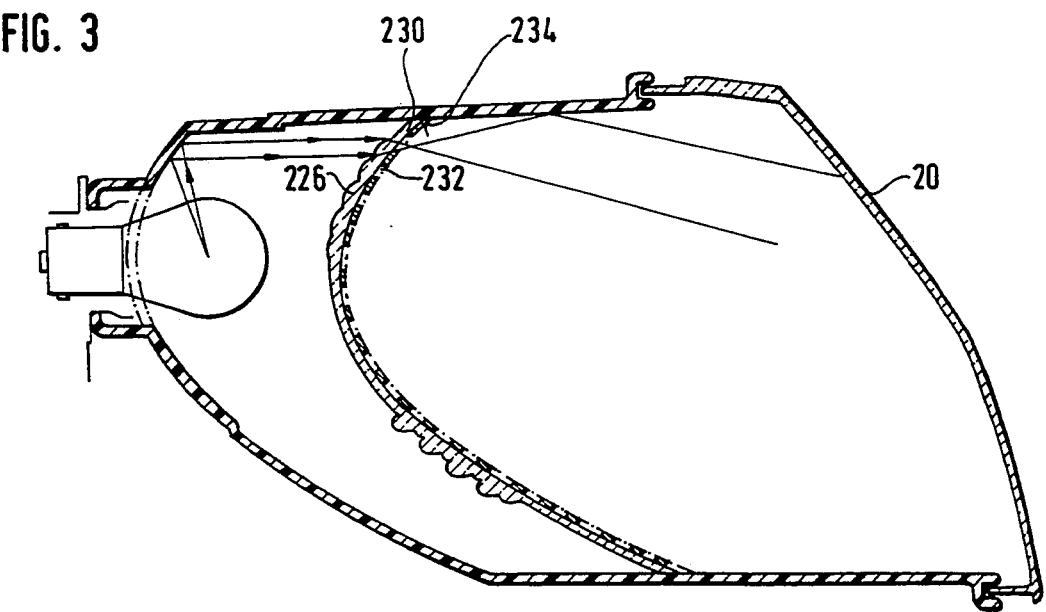
FIG. 3 is a view showing the light in accordance with a second embodiment of the invention.

In a second embodiment of the vehicle light shown in FIG. 3, the plate 230 of the screen device 28 and the lens disc are formed of one piece with one another. The plate 230 is composed of a transparent material such as synthetic plastic material or glass and on its side facing the reflector 10 is provided with collective lenses 226. The collective lenses 226 can be arranged on a curved surface of the plate 230 as shown in the upper region of FIG. 3, or can be stepped as shown in lower region of FIG. 3 and also utilized in the first embodiment of FIGS. 1 and 2, but they extend over the whole surface of the plate 230. The plate 230 on its side facing the cover disc 20 is provided with a reflective coating 234 which is interrupted for forming light permeable regions 232. The light reflected by the reflector 10 is directed by the collective lenses 226 on the light permeable regions 232 and can pass through the plate 230 without hindrance. In this second embodiment the measures taken for obtaining a desired light color can be utilized as well. Moreover, the plate 230 can be colored in a desired light color.

The plate 30, 130, 230 of the screen device 28 can be formed concavely curved at its side facing the cover disc 20. This is sufficient for the impression of the depth of the vehicle light, since only this side of the plate is visible from outside of the vehicle light.

The above described vehicle light can be used for example as a flashing light, in which case the light exiting the same has an orange color. The vehicle light can be arranged near a not shown headlight which due to its reflector appears as silver when observed from outside. The vehicle light due to the outwardly visible curved reflection layer on the plate of the screen device, appears also as silver and with a great depth and thereby a uniform impression with the headlight is ensured.

It will be understood that each of the elements described above, or two or more together, may also find a useful application in other types of constructions differing from the types described above.

While the invention has been illustrated and described as embodied in a light for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor vehicle signal light, comprising a light source; a reflector; a closure disc for closing the motor vehicle light from outside; a collective lens device arranged between said reflector and said closure disc; a screen device arranged between said collective lens device and said closure disc and having light impermeable regions and light permeable regions, said collective lens device directing light which is reflected from said reflector to said light permeable regions, said screen device being formed reflective at its side facing said closure disc, said screen device at least at its side facing said closure disc being curved concavely and parabolically so that when observed from outside the light appears to have a great depth.

2. A motor vehicle light as defined in claim 1, wherein said screen device is formed as a concavely curved plate.

3. A motor vehicle light as defined in claim 2, wherein said plate is composed of a light impermeable material and has a plurality of passages which form said light permeable regions.

4. A motor vehicle light as defined in claim 2, wherein said plate is composed of a transparent material, said plate at its side facing said closure disc being provided with reflecting, light impermeable coating which is interrupted at a plurality of locations for forming light permeable regions.

5. A motor vehicle light as defined in claim 2, wherein said screen device is formed as a plate which is of one piece with said collective lens device.

6. A motor vehicle light as defined in claim 1, wherein said screen device is formed as a plate which extends substantially parallel to a reflection surface of said reflector.

7. A motor vehicle signal light, comprising a light source; a reflector; a closure disc for closing the motor vehicle light from outside; a collective lens device arranged between said reflector and said closure disc; a screen device arranged between said collective lens device and said closure disc and having light impermeable regions and light permeable regions, said collective lens device directing light which is reflected from said reflector to said light permeable regions, said screen device being formed reflective at its side facing said closure disc, said screen device at least at its side facing said closure disc being curved concavely and parabolically so that when observed from outside the light appears to have a great depth, said screen device being formed as a plate.

* * * * *